United States Patent [19]
Cope et al.

[11] Patent Number: 5,689,267
[45] Date of Patent: Nov. 18, 1997

[54] AUTOMATIC VSWR SENSING FOR AIRCRAFT-MOUNTED PULSE RADAR SYSTEMS

[76] Inventors: Warren Bruce Cope, 12102 S. Hagan St., Olathe, Kans. 66062; Mark G. Roos, 11926 W. 49th Ter., Shawnee, Kans. 66216

[21] Appl. No.: 561,775

[22] Filed: Nov. 22, 1995

[51] Int. Cl.$^6$ ........................................... G01S 7/40
[52] U.S. Cl. ..................... 342/174; 342/198; 342/26
[58] Field of Search ........................... 342/165, 173, 342/174, 198, 26

[56] References Cited

U.S. PATENT DOCUMENTS

| | | | |
|---|---|---|---|
| 2,498,719 | 2/1950 | Spencer | 333/17.1 |
| 2,552,489 | 5/1951 | Lawson | 342/165 |
| 2,656,534 | 10/1953 | Jackson | 342/165 |
| 2,688,746 | 9/1954 | Young et al. | 455/80 |
| 2,691,775 | 10/1954 | Marcum | 342/203 |
| 2,997,709 | 8/1961 | Mumford | 342/198 |
| 3,020,529 | 2/1962 | Turner | 340/657 |
| 3,069,624 | 12/1962 | Friedman | 455/117 |
| 3,544,996 | 12/1970 | Pile | 343/17.7 |
| 3,801,978 | 4/1974 | Gershberg et al. | 340/516 |
| 3,870,957 | 3/1975 | Straw | 455/117 |
| 4,044,357 | 8/1977 | Goldie | 342/200 |
| 4,147,980 | 4/1979 | Rook | 455/81 |
| 4,232,278 | 11/1980 | Gawronski et al. | 333/13 |
| 4,274,156 | 6/1981 | Trefney | 455/115 |
| 4,353,037 | 10/1982 | Miller | 330/298 |
| 4,406,016 | 9/1983 | Abrams et al. | 455/19 |
| 4,692,724 | 9/1987 | Harris | 333/202 |
| 4,729,129 | 3/1988 | Koerner | 455/117 |
| 4,810,980 | 3/1989 | Heston et al. | 333/17.2 |
| 5,003,316 | 3/1991 | Ostermiller | 342/429 |
| 5,359,331 | 10/1994 | Adler | 342/124 |
| 5,576,713 | 11/1996 | Suzuki et al. | 342/174 |

FOREIGN PATENT DOCUMENTS 31 38 707 A  4/1983  Germany.

OTHER PUBLICATIONS

Patent Abstracts of Japan, vol. 017, No. 481 (p. 1604), Aug. 31, 1993–JP 05 119149 A (Matsushita Electric Works Ltd.), Patent Date: May 18, 1993.

*Primary Examiner*—John B. Sotomayor

[57] ABSTRACT

An aircraft mounted pulse radar unit transmits a low-energy, test output pulse and processes the resulting test return signal to determine the VSWR and whether the VSWR exceeds a predetermined threshold. If the VSWR exceeds the threshold, the unit prevents transmission of a nominal energy output pulse which might result in damage to the receiver due to an excessive energy level of the return signal. In one embodiment, the unit uses the VSWR to determine and enable output signals at reduced power levels such that energy levels of any return signals would be insufficient to damage the receiver.

20 Claims, 1 Drawing Sheet

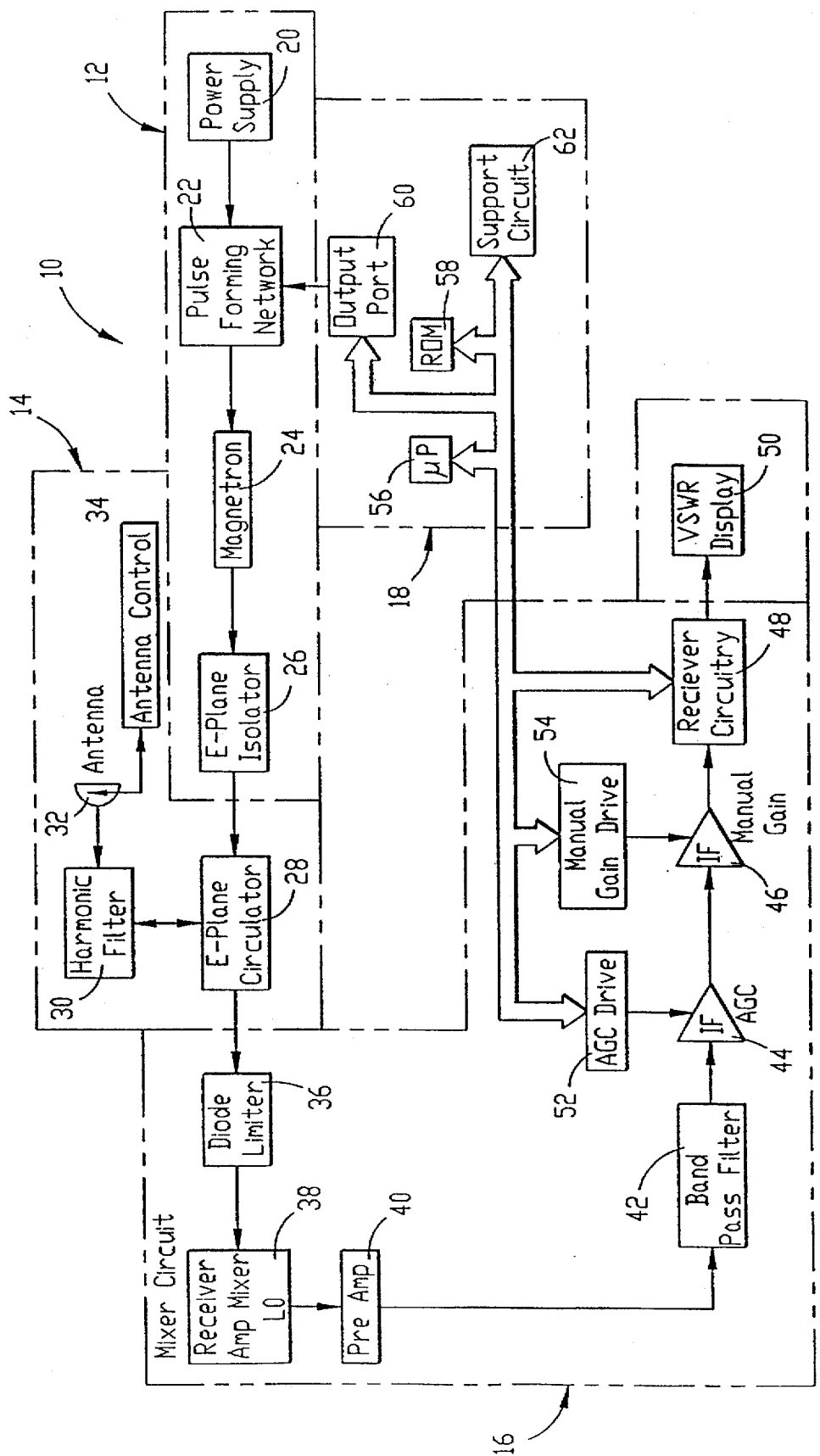

5,689,267

AUTOMATIC VSWR SENSING FOR AIRCRAFT-MOUNTED PULSE RADAR SYSTEMS

BACKGROUND OF THE INVENTION

1. Field of the Invention

The present invention relates to the field of aircraft-mounted, radar frequency units such as weather radar and transponders. More particularly, the invention is concerned with a radar frequency unit operable for transmitting a low energy test output signal and processing the resulting test return signal to determine the VSWR. If the VSWR exceeds a predetermined threshold, transmission of a nominal energy output signal is prevented.

2. Description of the Prior Art

Aircraft-mounted radar units are subject to receiver damage if a return signal presents an excessive energy level. This can occur, for example, if the radar unit is activated near a strong reflector such as a aircraft hangar. In such cases, the energy level of the return signal may exceed the capabilities of the receiver.

In order to minimize damage, some prior art units include a diode limiter as the first component in the receiver circuit. Particularly strong return signals, however, may exceed the capacity of the limiter. When this occurs, the radar unit is out of service and the aircraft may be grounded until the limiter is replaced.

Higher capacity limiters may be installed, but this adds additional cost to the radar unit and may not be practical because of space limitations in the radome. Accordingly, the prior art points out the need a way to prevent receiver damage from high energy return signals.

SUMMARY OF THE INVENTION

The present invention solves the prior art problems discussed above and provides a distinct advance in the state of the art. More particularly, the invention hereof provides an economical and space-saving means to prevent radar unit receiver damage caused by high energy return signals.

In the preferred embodiment, the radar unit transmits a low energy, test output signal such that the maximum energy level of a resulting test return signal is less than a maximum allowable level. The test return signal is then processed to determine whether the energy level of the test return signal exceeds a predetermined threshold, indicating that a nominal energy transmission would exceed the maximum allowable level. If this is the case, the unit prevents transmission of a nominal level output signal.

In preferred forms, the VSWR (voltage standing wave ratio) is determined from the test output and test return signals and the VSWR compared to a predetermined VSWR threshold. In one embodiment, the VSWR is used to determine the energy level for an output signal of lower power such that the energy level of a return signal would not exceed the maximum allowable level.

BRIEF DESCRIPTION OF THE DRAWINGS

The single drawing FIGURE is a block diagram representative of the preferred radar unit apparatus of the present invention.

DETAILED DESCRIPTION OF THE PREFERRED EMBODIMENT

As illustrated in the drawing figure, preferred radar frequency unit apparatus 10 includes transmitter section 12, antenna section 14, receiver section 16 and control section 18. The electrical components of apparatus 10 are preferably model ART 2000 available from AlliedSignal of Olathe, Kans., operable under program control and modified as described herein to implement the present invention. As used herein, radar frequency unit or radar apparatus also encompasses transponders in addition to weather radar systems, for example.

Transmitter section 12 includes power supply 20, pulse forming network 22, 4000 watt magnetron 24 and E-plane isolator 26. Power supply 20 and pulse forming network 22 provide magnetron 24 with a pulse of 3600 volts at 3 amps for 4 microseconds according to the pulse width signal received from control section 18. In response, magnetron 24 fires and provides an rf pulse to isolator 26 which protects the magnetron from being pulled in the event of a high VSWR from the antenna or radar.

Antenna section 14 includes E-plane circulator 28, harmonic filter 30, antenna 32 and antenna control circuit 34. Three-port circulator 28 receives the rf pulse from isolator 26 and allows the magnetron energy to pass through to antenna 32 by way of filter 30 but prevents energy passage to receiver section 16. Circulator 28 provides 20 dB reverse isolation. From circulator 28, the rf pulse passes through harmonic filter 30 which is a low pass filter having a break point of about 12 GHz. Filter 30 reduces the power in the second harmonic in order to satisfy radiated harmonic specifications. The rf pulse is then radiated by antenna 32 as an output signal to the atmosphere with a gain of 26.0 dBi as the preferred nominal energy level for a 10 inch antenna (or 27.8 dBi for a 12 inch antenna).

Antenna control circuit 34 includes conventional azimuth and pitch motors and respective drive circuits along with azimuth and pitch Hall sensors (not shown) coupled with control section 18. Circuit 34 controls the azimuth and pitch movements of antenna 32.

A return signal resulting from the transmission of the output signal is received by antenna 32 and passes to circulator 28 by way of filter 30. Circulator 28 prevents the return signal from passing to magnetron 24. Instead, circulator 28 presents the return signal to receiver section 16.

Receiver section 16 includes diode limiter 36, mixer circuit 38, pre-amplifier 40, band pass filter 42, AGC amplifier 44, manual gain amplifier 46, receiver circuit 48, display circuit 50, AGC drive 52 and manual gain drive 54. Diode limiter 36 receives the return signal from circulator 28 and is used to protect the components of receiver section 16 from damage caused by high energy level signals. In particular, limiter 36 limits the amount of return signal energy passed to the other components of receiver section 16. Moreover, even though circulator 28 provides 20 dB of isolation from magnetron 24, some magnetron energy passes from the receiver port of circulator 28. Limiter 36 also limits the amount of magnetron energy passed to the other receiver components.

Mixer 38 includes a low noise amplifier, mixer, local oscillator and unity gain buffer. Mixer 38 receives the return signal from limiter 36 and provides a buffered 59 MHz IF return signal with a gain of 5 dB to preamplifier 40 which provides a gain of about 30 dB. From preamplifier 40, the return signal passes through 800 kHz band pass filter 42.

Amplifiers 44 and 46 provide two stages of gain. AGC amp provides sensitivity timing control and the AGC can vary from 35 dB to −5 dB of gain according to the control input of AGC drive 52. Manual gain amplifier 46 is the amplifier adjusted when a manual gain adjustment is selected by the user of apparatus 10. The gain of amplifier 46 varies from about 30 dB to 10 dB depending upon the selected gain setting.

The return signal output from amplifier 46 is supplied to receiver circuitry 48 (individual components not shown) which processes the return signal in a conventional manner to provide digital data representative thereof to control section 18 by way of the data bus and to display circuit 50.

Display circuit 50 includes a conventional weather radar display and associated components to provide a visual representation of return signal to the pilot such as cloud formations. As discussed further herein, circuit 50 also includes a VSWR display.

AGC drive 52 and manual gain drive 54 provide gain control outputs to amplifiers 44 and 46 respectively according to data supplied over the data bus from control section 18.

Control section 18 includes microprocessor 56, read-only-memory (ROM) 58 and output port 60 along with conventional support circuit 62 (individual components not shown) such as RAM, EEPROM, chip select, reset and watchdog circuit, oscillator, time line interrupt, pulse width and AFC timing, input ports and multiplex gateways. Microprocessor 56 operates in accordance with a computer program stored in ROM 58. Output port 60 supplies the pulse width signal to pulse forming network 22 according to the program in ROM 58.

The preferred method of the present invention is implemented by the operating program stored in ROM 58 modified to perform the steps described herein. As discussed above, the nominal output signal is a 4 kW signal (6 kW with a 12 inch antenna) with a time pulse width of 4 microseconds resulting in a normal maximum reflected power in the return signal of 500 watts. Accordingly, receiver circuit 16 is configured to handle a 500 watt return signal and limiter 36 is configured to limit signal strength to this level. In some circumstances, however, a nominal output signal can result in a return signal exceeding the 500 watt level. This might occur upon reflection from a nearby reflector such as an aircraft hangar or when the radome is defective, for example. In such an event, the return signal energy level may be high enough to damage the limiter.

Accordingly, apparatus 10 is programmed to operate in a test mode from time to time as explained further herein. In the test mode, the program transmits a test output signal instead of the nominal output signal. The preferred test output signal presents a reduced energy level as a pulse having a time pulse width of 1 microsecond instead of the nominal 4 microseconds. As a result, the test output signal energy is about one fourth that of the nominal output signal energy. The test output signal energy is configured so that the maximum energy level of a resulting test return signal is less than the preferred maximum allowable level of 500 watts. That is to say, even if the aircraft is in the vicinity of a nearby reflector, the maximum energy level of a return signal would not exceed the maximum allowable level.

A test return signal resulting from transmission of the test output signal is received through antenna section 14 and processed in receiver section 16 and control section 18. As will be appreciated, the test return signal presents a low signal strength. Accordingly, the program causes AGC drive 52 and manual gain drive 54 to increase the gains of amplifiers 44 and 46 respectively to gains high enough for accurate analysis. In the preferred embodiment, the gains of amplifiers 44, 46 are adjusted to maximum below saturation.

Next, the program determines the relationship between the energy levels of the test output signal and the test return signal. Specifically, the program determines the VSWR which is presented on the display of display circuit 50. Next, the program compares the VSWR to a predetermined threshold, which is a VSWR of 2/1 in the preferred embodiment. If the VSWR exceeds this threshold, this indicates that transmission of a nominal energy level output signal would result in a return signal energy level exceeding the maximum allowable level. Accordingly, the program prevents transmission of a nominal energy level output signal.

In one embodiment of the invention, the program activates an alarm (included as part of display circuit 50) if the VSWR exceeds the threshold. In another embodiment, the program also calculates a reduced energy level for a reduced energy output signal (3 microseconds, for example) such that a resulting return signal would present an energy level less than the maximum allowable level, and then enables operation of apparatus 10 using reduced energy output signals. The reduced energy output signals are subject to a minimum requirement that the energy be sufficient for useful operation of apparatus 10.

In the preferred embodiment, the test mode would be implemented whenever apparatus 10 is energized, whenever the range is changed, or upon manual activation. It is also preferred that the program implement the test mode at each of selected antenna positions including the maximum and minimum, azimuth and pitch positions and the antenna center position.

Those skilled in the art will also appreciate that determination and display of the VSWR provides useful information during operation and repair. The VSWR display acts as an indicator to the pilot concerning the performance status of the radar unit. Additionally, the VSWR display can function as a radome tester. By comparing VSWR with the radome off with the VSWR when the radome is in place, a technician can determine how much signal reflection is caused by the radome itself.

The present invention encompasses many variations in the preferred embodiments described herein. For example, the utility of the invention is not limited to pulse radar systems or to radar units at the power levels described herein.

Having thus described the preferred embodiments of the present invention, the following is claimed as new and desired to be secured by Letters Patent:

1. In an aircraft-mounted, radar frequency unit including a transmitter operable for transmitting a radar frequency output signal at a nominal energy level, a receiver operable for receiving and processing a return signal resulting from transmission of the output signal, and control means for controlling the energy level of the output signal, a method of operating the unit comprising the steps of:

(a) preceding transmission of an output signal at a nominal energy level, transmitting a test output signal presenting an energy level such that the maximum energy level of a resulting test return signal is less than a maximum allowable level;

(b) for a test return signal, determining whether the energy level of said test return signal exceeds a predetermined threshold, such being indicative that a nominal energy level output signal would result in a return signal energy level exceeding said allowable level; and (c) if said test return signal energy level exceeds said threshold, preventing transmission of a nominal energy level output signal.

2. In an aircraft-mounted, radar frequency unit including a transmitter operable for transmitting a radar frequency output signal at a nominal energy level, a receiver operable for receiving and processing a return signal resulting from transmission of the output signal, and control means for controlling the energy level of the output signal, a method of operating the unit comprising the steps of:

(a) transmitting a test output signal presenting an energy level about one fourth of the energy level of a nominal energy level output signal such that the maximum energy level of a resulting test return signal is less than a maximum allowable level;

(b) for a test return signal, determining whether the energy level of said test return signal exceeds a predetermined threshold, such being indicative that a nominal energy level output signal would result in a return signal energy level exceeding said allowable level; and (c) if said test return signal energy level exceeds said threshold, preventing transmission of a nominal energy level output signal.

3. In an aircraft-mounted, radar frequency unit including a transmitter operable for transmitting a radar frequency output signal at a nominal energy level, said output signal being a pulse presenting an amplitude and a time pulse width, a receiver operable for receiving and processing a return signal resulting from transmission of the output signal, and control means for controlling the energy level of the output signal, a method of operating the unit comprising the steps of:

(a) transmitting a test output signal having about one fourth the pulse width of the nominal energy level output signal such that the maximum energy level of a resulting test return signal is less than a maximum allowable level;

(b) for a test return signal, determining whether the energy level of said test return signal exceeds a predetermined threshold, such being indicative that a nominal energy level output signal would result in a return signal energy level exceeding said allowable level; and (c) if said test return signal energy level exceeds said threshold, preventing transmission of a nominal energy level output signal.

4. The method as set forth in claim 1, further including the step of repeating steps (a)–(c) on a predetermined, periodic basis.

5. The method as set forth in claim 1, further including the step of performing steps (a)–(c) whenever the unit is energized.

6. The method as set forth in claim 1, the unit including an antenna shiftable among a plurality of positions, said method further including the step of repeating steps (a)–(c) at selected ones of said positions.

7. The method as set forth in claim 1, the unit being operable at a plurality of selectable range settings, said method including the step of repeating steps (a)–(c) whenever one of said range settings is changed.

8. The method as set forth in claim 1, the receiver including a signal energy limiter having a maximum capacity, said method including the step of performing step (a) so that said maximum allowable level corresponds to said maximum capacity.

9. The method as set forth in claim 1, the receiver including an amplifier with AGC, said method further including the step of adjusting said AGC to a level sufficient for performing step (b).

10. The method as set forth in claim 1, step (b) including the step of determining the VSWR of said test output signal and said test return signal and determining whether said VSWR exceeds a VSWR threshold as said predetermined threshold.

11. The method as set forth in claim 10, said method further including the step of providing a visual display of said VSWR.

12. The method as set forth in claim 1, step (c) including the step of activating an alarm.

13. The method as set forth in claim 1, there being a relationship between the energy levels of said test output signal and said test return signal, step (c) further including the steps of using said relationship to determine a reduced energy level for a reduced energy output signal such that a resulting return signal would present an energy level less than said maximum level, and enabling transmission of said reduced energy output signal.

14. The method as set forth in claim 13, said relationship being the VSWR, said method further including the step of using said VSWR as said relationship.

15. The method as set forth in claim 1, the unit being microprocessor-controlled in accordance with a computer program stored in memory, said method including the step of implementing steps (a)–(c) by way of a computer program stored in the memory.

16. The method as set forth in claim 1, the unit being microprocessor-controlled in accordance with a computer program stored in memory, said method including the step of revising the computer program in order to implement steps (a)–(c).

17. In an aircraft-mounted, radar frequency unit including a transmitter operable for transmitting a radar frequency output signal at a nominal energy level, said output signal being a pulse presenting an amplitude and a time pulse width, a receiver operable for receiving and processing a return signal resulting from transmission of the output signal, and microprocessor control means for controlling the energy level of the output signal in accordance with a computer program stored in memory, a method of operating the unit comprising the steps of:

(a) transmitting a test output signal as a pulse having a pulse width less than that of a nominal energy level output signal such that the maximum energy level of a resulting test return signal is less than a maximum allowable level, said maximum allowable level being an energy level above which the receiver is subject to damage;

(b) for a test return signal, determining the VSWR of said test output signal and said test return signal and determining whether said VSWR exceeds a predetermined VSWR threshold, such being indicative that a nominal energy level output signal would result in a return signal energy level exceeding said allowable level;

(c) if said VSWR exceeds said threshold, preventing transmission of a nominal energy level output signal; and said method including the step of implementing steps (a)–(c) in accordance with a computer program stored in memory.

18. The method as set forth in claim 17, further including the steps of using said VSWR to determine a reduced energy level for a reduced energy output signal such that a resulting return signal would present an energy level less than said maximum level, and enabling transmission of said reduced energy output signal.

19. An aircraft mounted radar apparatus comprising:

transmitter means for transmitting a radar frequency output signal at a nominal energy level;

receiver means for receiving and processing a return signal resulting from transmission of an output signal; and control means for controlling the operation of said transmitter and receiver means, said control means including means for controlling the transmission of a test output signal presenting an energy level such that the maximum energy level of a resulting test return signal is less than a maximum allowable level, transmission of said test output signal preceding transmission of said nominal energy level signal;

for a test return signal, determining whether the energy level of said test return signal exceeds a predetermined threshold, such being indicative that a nominal energy level output signal would result in a return signal energy level exceeding said allowable level; and if said test return signal energy level exceeds said threshold, preventing transmission of a nominal energy level output signal.

20. The apparatus as set forth in claim 19, the output signal being a pulse presenting an amplitude and a time pulse width, said control means including a microprocessor and a computer program stored in memory for operating said microprocessor, said test output signal being a pulse having a pulse width less than that of a nominal energy level output signal, said maximum allowable level being an energy level above which the receiver is subject to damage, said control means including means for determining the VSWR of said test output signal and said test return signal and determining whether said VSWR exceeds a VSWR threshold as said predetermined threshold.

* * * * *

UNITED STATES PATENT AND TRADEMARK OFFICE
CERTIFICATE OF CORRECTION

PATENT NO. : 5,689,267
DATED : November 18, 1997
INVENTOR(S) : Cope, Warren B. and Roos, Mark G.

It is certified that error appears in the above-identified patent and that said Letters Patent is hereby corrected as shown below:

On the title page add: -- Assignee: AlliedSignal Inc., Morristown, N.J. --

Signed and Sealed this

Seventh Day of July, 1998

Attest:

BRUCE LEHMAN

Attesting Officer

Commissioner of Patents and Trademarks